(12) United States Patent
Danger

(10) Patent No.: US 8,867,739 B2
(45) Date of Patent: Oct. 21, 2014

(54) INTEGRATED SILICON CIRCUIT COMPRISING A PHYSICALLLY NON-REPRODUCIBLE FUNCTION, AND METHOD AND SYSTEM FOR TESTING SUCH A CIRCUIT

(75) Inventor: Jean-Luc Danger, Antony (FR)

(73) Assignee: Institut Telecom—Telecom Paris Tech, Paris (FR)

( * ) Notice: Subject to any disclaimer, the term of this patent is extended or adjusted under 35 U.S.C. 154(b) by 58 days.

(21) Appl. No.: 13/522,680

(22) PCT Filed: Jan. 10, 2011

(86) PCT No.: PCT/EP2011/050234
§ 371 (c)(1),
(2), (4) Date: Aug. 20, 2012

(87) PCT Pub. No.: WO2011/086051
PCT Pub. Date: Jul. 21, 2011

(65) Prior Publication Data
US 2013/0202107 A1    Aug. 8, 2013

(30) Foreign Application Priority Data

Jan. 18, 2010 (FR) ...................................... 10 50297

(51) Int. Cl.
*G06F 21/00* (2013.01)
*G06F 21/31* (2013.01)
*G06F 21/73* (2013.01)
*H04L 9/08* (2006.01)
*G01R 31/317* (2006.01)

(52) U.S. Cl.
CPC .............. *H04L 9/0861* (2013.01); *G06F 21/31* (2013.01); *G06F 2221/2129* (2013.01); *G06F 21/73* (2013.01); *G01R 31/31719* (2013.01)
USPC ................................................ 380/44; 726/2

(58) Field of Classification Search
CPC ........................ G06F 21/73; G06F 2221/2129
USPC .............................................................. 380/44
See application file for complete search history.

(56) References Cited

U.S. PATENT DOCUMENTS 8,510,608 B2 * 8/2013 Futa et al. ........................ 714/52
2006/0221686 A1 * 10/2006 Devadas et al. ........... 365/185.03
(Continued)

OTHER PUBLICATIONS

Abhranil Maiti, et al., "Improving the Quality of a Physical Unclonable Function Using Configurable Ring Oscillators", 2009 International Conference on Field Programmable Logic and Applications, Aug. 31, 2009, pp. 703-707, IEEE, Piscataway, NJ, USA, XP031534086.

(Continued)

*Primary Examiner* — Hadi Armouche
*Assistant Examiner* — Bryan Wright
(74) *Attorney, Agent, or Firm* — Baker & Hostetler LLP (57) ABSTRACT

A silicon integrated circuit includes a physically non-copyable function LPUF that generates a signature specific to the circuit. The function includes a ring oscillator composed of a loop traversed by a signal. The loop is formed of N topologically identical chains of lags connected in series and an inversion gate, a chain of lags being composed of M delay elements connected in series. The function also includes a control module generating N control words being used to configure the value of the delays introduced by the chains of lags on the signal traversing them. A measurement module measures the frequency of the signal at the output of the last chain of lags after updating the control words, and the control module can deduce from the frequency measurements the bits making up the signature of the circuit. A method and a system for testing such circuits are also provided.

18 Claims, 5 Drawing Sheets

(56) References Cited

U.S. PATENT DOCUMENTS

2008/0279373 A1* 11/2008 Erhart et al. .................... 380/46
2009/0083833 A1* 3/2009 Ziola et al. ........................ 726/2

OTHER PUBLICATIONS

G. Edward Suh, et al., "Physical Unclonable Functions for Device Authentication and Secret Key Generation", 44th ACM Design Automation Conference, Jun. 1, 2007, pp. 9-14, XP031183294.

Chi-En Yin, et al., "Temperature-Aware Cooperative Ring Oscillator PUF", IEEE International Workshop on Hardware-Oriented Security and Trust, Jul. 27, 2009, pp. 36-42, IEEE, Piscataway, NJ, USA, XP031520802.

H. Yu, et al., "Towards a Unique FPGA-Based Identification Circuit Using Process Variations", International Conference on Field Programmable Logic and Applications, Aug. 31, 2009, pp. 397-402, IEEE, Piscataway, NJ, USA, XP031534036.

Pappu Srinivasa Ravikanth, "Physical One-Way Functions", Massachusetts Institute of Technology, Mar. 2001, pp. 1-154.

Blaise Gassend, et al., "Silicon Physical Random Function", Massachusetts Institute of Technology, Computation Structures Group Memo 456, ACM Conference on Computer and Communications Security, 2002, pp. 148-160.

* cited by examiner

INTEGRATED SILICON CIRCUIT COMPRISING A PHYSICALLLY NON-REPRODUCIBLE FUNCTION, AND METHOD AND SYSTEM FOR TESTING SUCH A CIRCUIT

CROSS-REFERENCE TO RELATED APPLICATIONS

This application is a National Stage of International patent application PCT/EP2011/050234, filed on Jan. 10, 2011, which claims priority to foreign French patent application No. FR 1050297, filed on Jan. 18, 2010, the disclosures of which are incorporated by reference in their entirety.

FIELD OF THE INVENTION

The invention relates to a silicon integrated circuit comprising a physically non-copyable function and a method, based on reliability testing, for selecting such a circuit. It applies notably to the fields of cryptography circuits and the authentication of electronic components.

For numerous applications, it is useful to be able to unambiguously identify an electronic chip or an integrated circuit. Solutions are proposed in the prior art making it possible notably to distinguish a given circuit from among a series of circuits arising from the same production facility. Thus, incorporating into an integrated circuit a physically non-copyable function of PUF type, the acronym deriving from the expression "Physically Unclonable Function", allows the generation of a unique signature specific to said circuit. This signature may be used to put in place an electronic system authentication mechanism.

BACKGROUND

This unique signature can also be used as unique encryption key specific to the circuit. In this case, the storage of the key within the integrated circuit is not required.

The signatures are generated directly by the circuits. Human intervention not being required, the resistance to attacks, notably of observation attack type, is improved.

There exist in the prior art various ways of implementing PUF functions. Thus, the article by R. Pappu entitled *Physical One-Way Functions*, PhD Thesis, Massachusetts Institute of Technology, March 2001, describes what constitutes an optical PUF. Optical PUFs are composed of a transparent material comprising randomly dispersed particles allowing the deviation of laser light.

Coating PUFs are also used. This type of PUF is described in the article by P. Tuyls, B. Skoric and T. Kevenaar entitled *Security with Noisy Data: Private Biometrics, Secure Key Storage and Anti-Counterfeiting*, Secaucus, N.J. USA: Springer-Verlag New York, 2007. In this case, an opaque material is randomly doped with dielectric particles and is positioned above the integrated circuit.

A family of PUFs called silicon PUFs uses the structural incoherencies introduced by methods for fabricating integrated circuits. The difference in dispersion between the wires and the transistors making up said circuits is indeed significant from one circuit to another, even if they form part of the same slice. This family comprises notably arbiter PUFs, ring oscillator PUFs and SRAM PUFs. Silicon PUFs may be implemented in ASIC or FPGA circuits without any technological modification.

Arbiter PUFs are described in the article by B. Gassend, D. E. Clarke, M. van Dijk, and S. Devadas, entitled *Silicon physical random functions*, ACM Conference on Computer and Communications Security, 2002, pages 148-160. In this type of PUF, one and the same signal propagates by following two paths of a delay circuit, the two circuits being distinct and being configurable with the aid of control words. An arbiter compares the delay between the two signals resulting from these two propagations, and the result of this comparison culminates in the signature of the integrated circuit. One of the drawbacks of this type of PUF is that the elements allowing the parametrization of the paths must be balanced in terms of delays, thereby rendering their design difficult.

PUFs with pairs of ring oscillators are also silicon PUFs. They are described in the article by G. E. Suh and S. Devadas entitled *Physical unclonable functions for device authentication and secret key generation*, DAC, 2007, pages 9-14. The frequencies generated by a pair of identical ring oscillators are compared. The result of this comparison culminates in the signature of the integrated circuit. A drawback of ring oscillators is that said oscillators are sensitive to so-called second-order effects such as for example the effects related to the mutual coupling between the oscillators or to the disturbances introduced on an oscillator during an attack.

SUMMARY OF THE INVENTION

An aim of the invention is notably to alleviate the aforementioned drawbacks.

For this purpose the subject of the invention is a silicon integrated circuit comprising a physically non-copyable function LPUF allowing the generation of a signature specific to said circuit. Said function comprises a ring oscillator composed of a loop traversed by a signal e, said loop being formed of N topologically identical chains of lags, connected to one another in series and of an inversion gate, a chain of lags being composed of M delay elements connected to one another in series. It also comprises a control module generating N control words, said words being used to configure the value of the delays introduced by the chains of lags on the signal e traversing them. It also comprises a measurement module measuring the frequency of the signal at the output of the last chain of lags after the updating of the control words. It also comprises means for deducing from the frequency measurements the bits making up the signature of the circuit.

The circuit is, for example, an ASIC circuit or an FPGA.

According to one embodiment, the signature is used as encryption key.

According to another embodiment, the signature is used for its authentication.

The delay elements comprise, for example, means for steering the signal traversing them according to at least two distinct paths, a path introducing a delay value being specific thereto, the steering being controlled by at least one bit belonging to a control word.

According to one aspect of the invention, challenge words composed of a concatenation of control words are presented at the input of the control module, said module generating combinations on the basis of said words so as to configure the chains of lags.

The bits of the signature are, for example, determined as a function of the ranking of the frequencies measured for the various combinations of the control words.

The bits of the signature are determined, for example, as a function of the estimated differences between two measured frequency values, a measured frequency value corresponding to a combination of control words.

The bits of the signature are, for example, determined as a function of the value of the ratio between two estimated frequency differences.

In one embodiment, the circuit comprises a random number generator, the numbers generated being used so as to select the order in which the frequencies corresponding to the combinations of the control words are measured.

The circuit comprises, for example, at least one parity bit, such a bit being used to correct a bit, generated with an error, of the signature.

The subject of the invention is also a method of testing integrated circuits comprising a physically non-copyable function LPUF. A succession of steps is applied to the tested circuits so as to select the circuits making it possible to generate a signature specific to said circuit with a chosen reliability level, these steps corresponding to a selection of the parameters T and Th for configuring the test as well as B combinations of control words having a Hamming distance at least equal to a predefined value HD, and then to a phase of measurements during which representative quantities indicative of the signature bits of the circuit are measured, up to T measurements being performed per signature bit, these T measurements being accumulated so as to decide whether the corresponding bit is indeterminate, the decision being taken after comparison with at least one value deduced from the value of the parameter Th, the tested circuits being selected as a function of the number of indeterminate bits detected.

According to one mode of implementation, the method comprises a step of determining the probability that a circuit is not selected, said probability being determined by using the expression:

$$P_{rej} = 1 - \left[1 - \mathrm{erf}\left(\frac{Th}{\sigma \times \sqrt{2 \times HD}}\right)\right]^B$$

in which:
erf( ) is the Gauss error function;
$\sigma$ is the variance of the measurements of the quantities representative of the signature bits of the circuit.

According to another mode of implementation, the method comprises a step of determining the probability of error per signature bit, said probability being determined by using the expression:

$$P_{e,j} = \frac{1}{2}\left(1 - \mathrm{erf}\left(\frac{\sqrt{T} \times \delta_j}{s\sqrt{2}}\right)\right)$$

in which:
$\delta_j$ is a frequency difference measured between two frequencies corresponding to the application of two distinct combinations of control words;
s is defined such that $s^2$ is the variance of the measurement noise.

A circuit is selected, for example, if no bit of the signature is indeterminate.

When the LPUF function of a tested circuit is associated with a parity bit whose value is determined on the basis of the signature of said circuit, said circuit is selected, for example, if the number of indeterminate bits is strictly less than 2.

The values of $s^2$ and of $\sigma^2$ are measured, for example, for a temperature substantially equal to +70° C. and a supply voltage for the circuits that is substantially lower by 5% with respect to the nominal supply voltage, the measurements phase being conducted under the same conditions.

The subject of the invention is also a test system implementing the method according to the invention. The system is composed of a computer furnished with a user interface, with an item of equipment making it possible to control measurement probes, the function of said probes being to collect the measurements of the representative quantities indicative of the signature bits and produced by the tested circuits, the processing operations associated with this phase being thereafter performed by the computer and displayed on its interface.

BRIEF DESCRIPTION OF THE DRAWINGS

Other characteristics and advantages of the invention will become apparent with the aid of the description which follows given by way of nonlimiting illustration, offered with regard to the appended drawings among which.

DETAILED DESCRIPTION

Figure 1:
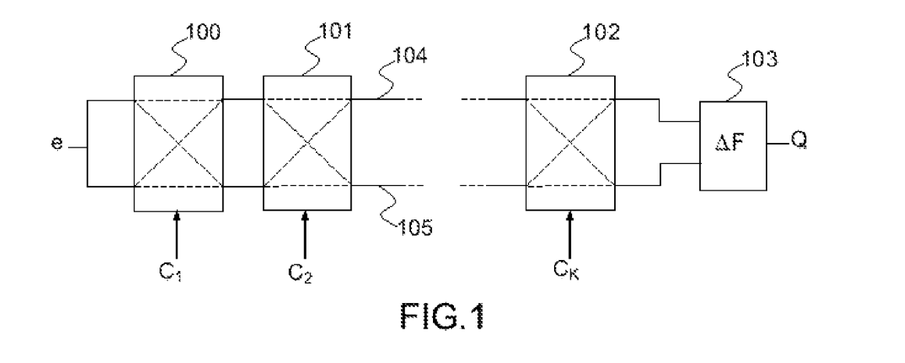
FIG. 1 gives an exemplary arbiter PUF.

FIG. 1 gives an exemplary arbiter PUF. An arbiter PUF is customarily composed of a chain of K delay elements 100, 101, 102 connected to one another in series and of an arbiter element 103 connected to the last delay element of said chain. A signal e is introduced into the PUF and traverses two different electronic paths 104, 105. The delay elements 100, 101, 102 may be configured with the aid of a binary control word of K bits $C_1, C_2, \ldots, C_K$. To a word of K bits there corresponds a configuration for each of the two paths 104, 105. This configuration is unique for a given binary control word, each of the bits of said word being used to configure one of the delay elements 100, 101, 102, a delay element having a steering function and participating in the definition of the two unique paths associated with a control word.

The arbiter element 103 compares the delays introduced by these two paths 104, 105 between the two signals arising from e, the result of this comparison culminating in a bit Q. By modifying the control word, another bit Q is generated. Thus it is possible to thus generate binary words used as signature of the circuit in which the arbiter PUF is implemented.

Figure 2:
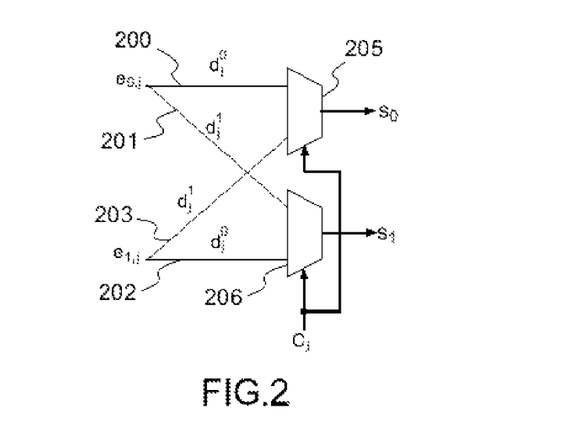
FIG. 2 presents a delay element that may be used in an arbiter PUF.

FIG. 2 presents a delay element that may be used in an arbiter PUF. This delay element is for example the j-th element of a chain of K elements. Two signals $e_{0,j}$ and $e_{1,j}$ are presented as input to this delay element. The output of said element corresponds to two signals $s_0$ and $s_1$.

The input signals are steered as a function of the value taken by the control bit $C_j$, said bit controlling two gates 205, 206 allowing this steering.

For example, the signal $e_{0,j}$ can follow either a first path 200 if $C_j=0$ or a second path 201 if $C_j=1$. In the first case, the output signal s0 corresponds to the input signal $e_{0,j}$ affected by the delay $d_0^j$ associated with the first path 200 and in the second case, the output signal s1 corresponds to the input signal $e_{0,j}$ affected by the delay $d_1^j$ associated with the second path 201.

With regard to the signal $e_{1,j}$, the latter will then follow either a first path 202 if $C_j=0$ or a second path 203 if $C_j=1$. In the first case, the output signal s1 corresponds to the input signal $e_{1,j}$ affected by the delay $d_0^j$ associated with the first path 202 and in the second case, the output signal s1 corresponds to the input signal $e_{1,j}$ affected by the delay $d_1^j$ associated with the second path 203.

So that these delay elements allow the implementation of an arbiter PUF, it is necessary that the paths internal to said elements be balanced, that is to say that the parallel paths (200, 202) be identical and the crossed paths (201, 203) be identical. This balancing is all the more complex the more the paths can cross at the level of each delay element. The implementation of arbiter PUFs is therefore complex.

Figure 3:
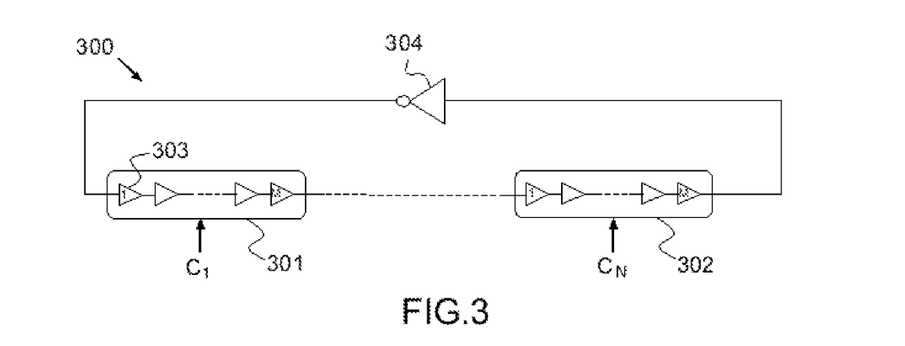
FIG. 3 gives an exemplary silicon PUF according to the invention comprising a loop structure.

FIG. 3 gives an exemplary silicon PUF according to the invention comprising a loop structure. The silicon PUF of this example is designated in the subsequent description by the acronym LPUF deriving from the expression "Loop Physically Unclonable Function".

An LPUF is a silicon PUF comprising a loop 300 formed of N chains of lags 301, 302, N being at least equal to 2. This loop forms a simple ring oscillator.

A chain of lags 301, 302 is composed of M delay elements 303. Unlike a ring oscillator PUF, the oscillator of the LPUF comprises a single oscillator.

One of the advantages of the structure of an LPUF is that the noise is common to all the delay chains. Moreover, there is no problem of mutual coupling between oscillators, since there is just one loop.

Each delay chain 301, 302 receives a control word Ci of M bits, a word corresponding to a delay value specific to the circuit.

A bit $C_{i,j}$ of a control word $C_i$ corresponds to a lag value of delay element number j among the M elements of the chain of lags i.

During the design of an LPUF and more particularly during the placement-routing consisting in transforming the logic gates and their interconnections into gates with transistors and into real wires, the chain of lags is duplicated N times in a rigorously identical manner. This duplication may be implemented easily, whether within the framework of the design of ASIC circuits or FPGA circuits. It follows from this that an LPUF is particularly simple to design.

Figure 4:
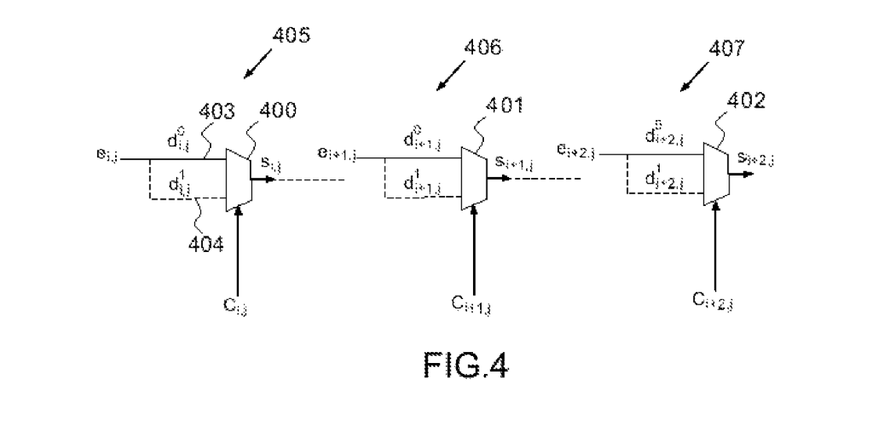
FIG. 4 gives an example of delay elements that may be used in a chain of lags included in an LPUF.

FIG. 4 gives an example of delay elements that may be used in a chain of lags included in an LPUF.

An input signal $e_{i,j}$ is introduced into the delay element 405. Said signal can propagate by following two distinct paths 403, 404. The choice of the path depends on the value of the control bit $C_{i,j}$ associated with the control element, said bit having the aim of selecting one of the two paths 403 or 404 with the aid of a multiplexer 400. The indices i and j indicate respectively the chain index and the index of the element in the chain.

By way of example, if $C_{i,j}=0$, the input signal $e_{i,j}$ will follow a first path 403 and the output of the first delay element will correspond to the signal $e_{i,j}$ affected by a delay $d_{i,j}^0$, said delay resulting from the propagation of the signal along this first path. Conversely, if $C_{i,j}=1$, the input signal $e_{i,j}$ will follow a second path 404 and the output of the first delay element will correspond to the signal $e_{i,j}$ affected by a delay $d_{i,j}^1$, said delay resulting from the propagation of the signal along this second path.

Advantageously, it is not necessary to carry out a balancing between the various paths of a delay element 403, 404 since it suffices to duplicate the delay elements in order to have clones 406, 407 of the original element 405 corresponding to the jth element within one and the same chain. Balance is therefore easier to guarantee than in an arbiter PUF since the various paths of a delay element do not cross.

The delay elements do not have the same physical characteristics from one chain to the next and thus introduce different delays that the LPUF can exploit.

Figure 5:
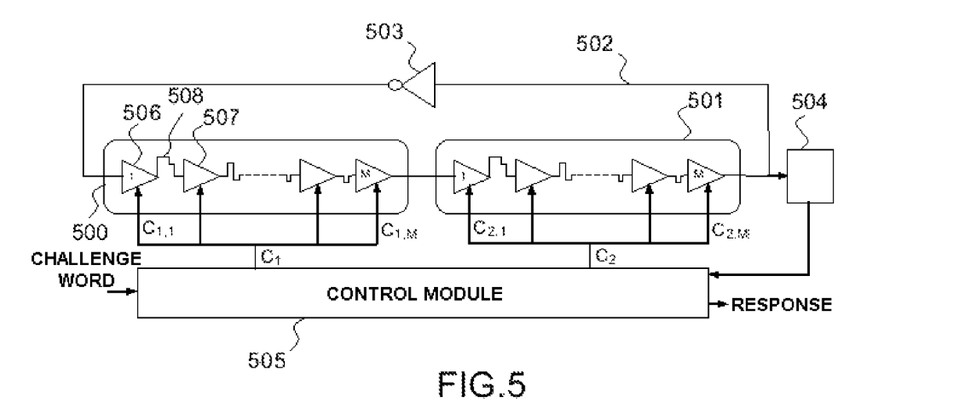
FIG. 5 presents an LPUF comprising N=2 chains of lags.

FIG. 5 presents an LPUF comprising N=2 chains of lags. The two chains of lags 500, 501 each comprise M delay elements. These chains of lags are topologically, that is to say functionally, identical and have the same physical structure. The delay elements 506, 507 as well as their interconnection 508 are found again identically in the second chain of lags 501. The chains are linked to one another in series and the output of the second is looped to the input of the first with the aid of a loop line 502. A logic gate 503 carrying out an inversion function is placed on said loop 502. This looped assembly constitutes a configurable oscillator.

The two delay elements 500, 501 are controlled respectively by two binary words $C_1$ and $C_2$.

$C_1$ and $C_2$ are each composed of M bits denoted respectively $C_{1,1}, C_{1,2}, \ldots, C_{1,M}$ and $C_{2,1}, C_{2,2}, \ldots, C_{2,M}$. These two words are generated by a control module 505.

The frequency of the output signal of the last chain of lags is analyzed by a measurement module 504. The frequency value measured depends on the delays introduced by the various chains of lags, and therefore on the control words applied to them. The control module 505 applies, for example, successively a first value of the pair $(C_1, C_2)=(0, 2^j)$, that is to say that $C_{2,j}=1$ ($j \in [1; M]$) and that the other bits of $C_1$ and $C_2$ are equal to zero, and then a second value of the pair $(C_1, C_2)=(2^j, 0)$.

The measurement module 504 successively measures the frequencies of the signals corresponding to the application of the two values of the pair $(C_1, C_2)$, said measurements being denoted respectively freq(0, $2^j$) and freq($2^j$, 0). From these measurements are deduced quantities representative of the bits of the signature. For example, a frequency difference $\delta_j$ is thereafter estimated by the control module 505 using the following expression:

$$\delta_j = \text{freq}(0, 2^j) - \text{freq}(2^j, 0) \quad (1)$$

The difference of propagation lags in the chains of lags, a consequence of the application of the two values of the pair $(C_1, C_2)$ modifying the path followed by the signal, is not zero and may be exploited. Indeed, this difference in lags impacts the difference in frequency measured $\delta_j$, the latter consequently being usable notably for the generation of the bits of the signature specific to the circuit.

Thus, a convention may be chosen in such a way as to generate the bits of the signature on the basis of the representative quantities $\delta_j$ indicative of the bits of the signature. For example, if N=2, the bit i is equal to 0 if $\delta_j$ is positive and equal to 1 if $\delta_j$ is negative.

In order to generate the various bits of the signature, binary words, called "challenge words" in the subsequent description, are presented to the input of the LPUF and processed by the control module 505. The control module 505 generates on this basis combinations of control words used to configure the chains of lags and so that frequency differences can be measured. Indeed, a challenge word is composed of N control words. These control words may be combined in different ways according to N! possible control combinations of the N words $C_i$, the exclamation mark representing the factorial operation, so as to obtain as many configurations as possible of the chains of lags. A response is then determined, for example by the control module. For N=2, an exemplary response corresponding to the signature of the circuit may be expressed as a function of the previously mentioned frequency difference. If N>2, a response may be determined, for example, as a function of the order of the frequencies for the N! possible control combinations.

With the aim of comparing and sorting the frequencies obtained for various combinations of control and therefore of lags, it is necessary for there to be at least two different combinations of words $C_i$. If the total Hamming distance HD of the combination of words $C_i$ is considered, HD may be expressed using the expression:

$$HD = \sum_{i=1, i'>i}^{i=N} HW(C_i \oplus C_{i'}) \; i, i' \in [1, N] \quad (2)$$

in which:
HW( ) is a function determining the Hamming weight;
⊕ represents the exclusive OR logic operation.

If $(C_i, C_{i'})$ are two control words established on the basis of a combination of words acting on N chains, the condition expressed by the following expression must preferably be satisfied in order to be certain of having at least two different combinations:

$$\forall i, i' \in [1, N] HD \geq 1 \quad (3)$$

Moreover, the $j^{th}$ bit of the N chains of lags must not remain at the value '1', otherwise no difference of bits can be detected by the controller. The $j^{th}$ bit can always be equal to '0' by convention. For example, if N=2 and M=3, the difference $\delta_j$ obtained for the value of the pair $(C_1, C_2)=(0, 1)$ is the same as for the pair values $(C_1, C_2)=(2, 3), (C_1, C_2)=(4, 5)$ and $(C_1, C_2)=(6, 7)$, stated otherwise, the following expression must be satisfied:

$$\forall j \in [1, M] \quad (4)$$
$$\prod_{i=1}^{N} (C_{i,j}) = 0$$

An LPUF can also include a mechanism for protecting against attacks by observation or by fault injection. Accordingly, a random number generator may be integrated into the circuit. The latter may be used to select the order in which the frequencies are measured. Thus the attacker can neither force a bit value nor ascertain the value of a bit since the measurement of the frequencies is done in a random sequence of the control words.

Advantageously, an LPUF is resistant to noise and interference related to the environment. Indeed, the chains of lags making up the LPUF are affected in an identical way by disturbance noise. The result of the frequency measurements is therefore hardly affected by this noise if it is of greater duration than the measurement, and consequently, the generation of the signature remains reliable, which may not be the case for the PUFs with pairs of ring oscillators.

For an application aimed at the authentication of a circuit, an LPUF may be used with a CRP mechanism, the acronym deriving from the expression "Challenge-Response Pair".

This mechanism may be implemented by integrating an LPUF into said circuit. A challenge message or word is presented to said LPUF and the latter thereafter determines a response message making it possible to authenticate the circuit. Indeed, this response message corresponds to a signature generated by the PUF and is specific to said circuit.

An LPUF can also be used for encryption key generation. Accordingly, the LPUF itself uses a subset of challenge message and the signature thus generated may be used as encryption key.

A challenge word corresponds to the concatenation of N control words $C_i$ (i∈[1, ..., N]), a control word being used for each of the N chains of lags. The response word is the result of the measurements and of the frequency comparisons resulting from the N! possible combinations of the N words Ci, the exclamation mark representing the factorial operation. So as to have N! different combinations it is possible to supplement the conditions (3) and (4) with the fact that all the control words Ci are different. This can be expressed by:

$$i, i' \in [1, N] \prod_{i \neq i'} (C_i \oplus C_{i'}) \geq 1 \quad (5)$$

The measured frequencies are compared with one another so as to form a response in accordance with a given protocol. For example the N! combinations may be sorted differently to obtain (N!)! arrangements.

Figure 6:
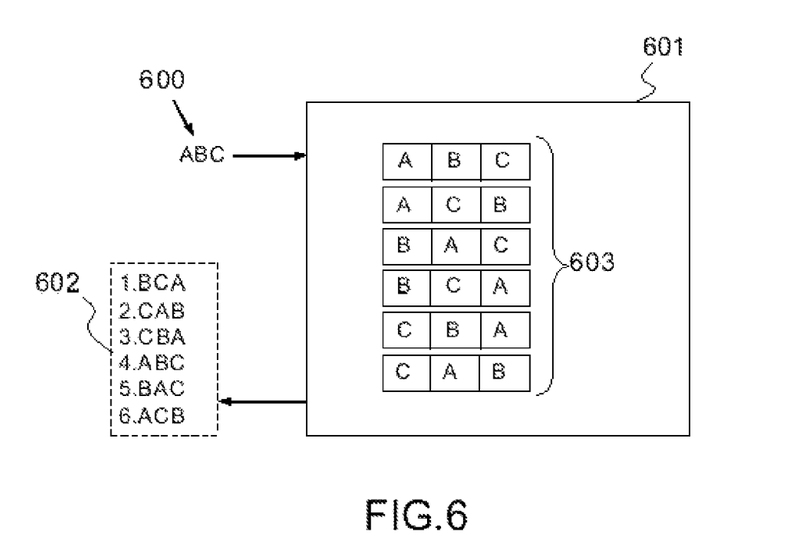
FIG. 6 gives an exemplary scheme for combining the control words used in an LPUF.

FIG. 6 gives an exemplary scheme for combining the control words used in an LPUF. In this example N=3 and the control words $C_j$ can take three values A, B and C 600 complying with conditions (3), (4) and (5). Thus, 6 possible combinations 603 may be generated for the control words (C1, C2, C3) and 720 frequency arrangements may be obtained.

Advantageously, the number of possible challenge words is significantly more considerable than for an arbiter PUF. Indeed, for an arbiter PUF this number equals $2^M$. For an LPUF, and taking account of expressions (3), (4) and (5), the number of possible challenge words is given by the following table (1) for certain values of N and M:

TABLE (1)

| | Number of possible challenge words | | | | | | | | | |
|---|---|---|---|---|---|---|---|---|---|---|
| | M | | | | | | | | | |
| | 2 | 3 | 4 | 5 | 6 | 7 | 8 | 10 | 12 | 16 |
| Arbiter | 4 | 8 | 16 | 32 | 64 | 128 | 256 | 1K | 4K | 64K |
| LPUF N = 2 | 4 | 13 | 40 | 121 | 364 | 1093 | 3280 | 29524 | ~250K | ~21M |

TABLE (1)-continued

| | Number of possible challenge words | | | | | | | | | |
|---|---|---|---|---|---|---|---|---|---|---|
| | M | | | | | | | | | |
| | 2 | 3 | 4 | 5 | 6 | 7 | 8 | 10 | 12 | 16 |
| LPUF N = 3 | 4 | 44 | 360 | 2680 | 19244 | ~130K | ~1M | ~45M | ~2G | ~5000G |

Advantageously, the number of different signatures that may be generated is therefore very high for an LPUF in comparison with an arbiter PUF.

For an application aimed at generating an encryption key intrinsic to the component on which the LPUF is implemented, one scheme consists in using predefined control words, that is to say control words stored by the circuit. The principle is the same as authentication except that there is no dispatching of challenge words, it is up to the LPUF to consider a subset of challenge words on which the frequencies of the combinations are measured and compared.

In order to illustrate the principle of this scheme we consider a control module for the LPUF using identical control words Ci whose bits are forced to zero, except for a control word one of whose bits takes the value 1. The value associated with this control word is $2^j$, j denoting the j-th delay element used to generate a bit of the key. The control module for the LPUF thereafter generates N! combinations by applying a permutation to the N control words Ci. As in this example all the control words are identical (zero) apart from one, the number of combinations is equal to N and not N!. The N frequencies corresponding to these N combinations are obtained through measurements.

A measured frequency value corresponds to a combination of control words $(C_1, \ldots, C_N)$, said value being denoted $freq(C_1, \ldots, C_N)$. Thus, the N frequencies $f_1, f_2, \ldots, f_N$ corresponding to the N combinations mentioned hereinabove and can be written in the following manner:

$$f_1 = freq(0, 0, \ldots, 2^j)$$

$$\ldots$$

$$f_{N-1} = freq(0, 2^j, \ldots, 0)$$

$$f_N = freq(2^j, 0, \ldots, 0)$$

These measured frequencies are sorted, for example, in such a way that to a difference or a combination of measured frequencies there corresponds a bit of the signature to be generated.

By way of example, if N=2, a difference of frequencies $\delta_j$ makes it possible to obtain the j-th bit of the encryption key, said difference being determined by using the expression (1).

In the case where N=3, there are 3 possible values of frequencies and consequently six possible combinations. The three values are:

$f_1 = freq(0,0,2^j)$ $f_2 = freq(0,2^j,0)$ $f_3 = freq(2^j,0,0)$

The bits of the encryption key can thereafter be deduced with the aid of a table an example of which is given hereinbelow:

TABLE (2)

exemplary correspondence between measured frequencies and bits of the signature

| Combination of measured frequencies | | | Bit of the key |
|---|---|---|---|
| $f_1$ | $f_2$ | $f_3$ | 1 |
| $f_1$ | $f_3$ | $f_2$ | 1 |
| $f_2$ | $f_3$ | $f_1$ | 0 |
| $f_3$ | $f_2$ | $f_1$ | 0 |
| $f_3$ | $f_1$ | $f_2$ | 0 |
| $f_2$ | $f_1$ | $f_3$ | 1 |

This same scheme can be applied using predefined challenge words to obtain the signature. The number of challenge words is related to the number of bits that can be extracted to constitute an encryption key or a response word used to authenticate the circuit comprising the LPUF.

For example, if N=2 and M=5, by taking account of table (1), it is possible to obtain 121 different bits.

If N is greater than 2, the number of bits that can be obtained increases rapidly since there exist (N!)! possible arrangements, as explained previously in the description.

The maximum number of bits making up the signature is equal to the number of possible challenge words, multiplied by the logarithm to base 2 of (N!)!. Table (1) shows that there exists a very considerable number of challenge words and therefore of signature bits. The latter may, however, be redundant since challenge words may share the same combinations of bits, for example if N=3, the challenge word M1=(0,1,2) is close to the challenge word M2=(0,1,3). This redundancy remains low on choosing combinations of control words having very large distances between them. Thus this choice may be for example carried out while complying with a distance constraint such that the Hamming distance between a challenge word and the N! combinations of the other words is not less than a minimum value. In the previous example, the distance between M1 and M2 is HW[(0,1,2)⊕(0,1,3)]=1. If the chosen minimum value is 2, one of these challenge words will be rejected.

The LPUF circuit can comprise a parity bit. Indeed, notably because of the physical characteristics of the circuit after fabrication, one of the bits of the signature may be generated in an erroneous manner.

The parity bit is computed by the circuit on all the bits of the signature. One convention that may be used is to set the parity bit to '0' if the number of signature bits at '1' is even.

A nonvolatile memory may be used to save this bit. If an FPGA circuit is used, it suffices to have 2 configuration files specific to each value of the parity bit.

In order to reduce the probability of generating an erroneous signature bit, several measurements of the quantities representative of the signature bits, also called trials, may be performed successively by the LPUF measurement module for a given control combination. The values obtained by virtue of these trials are thereafter accumulated and the sign of the accumulated result gives the signature bit.

When a parity bit is associated with the operation of the LPUF, the least reliable bit may be readily detected during the processing corresponding to the trials.

This bit can then be readily corrected by inverting it if it turns out that the parity is not complied with.

Figure 8:
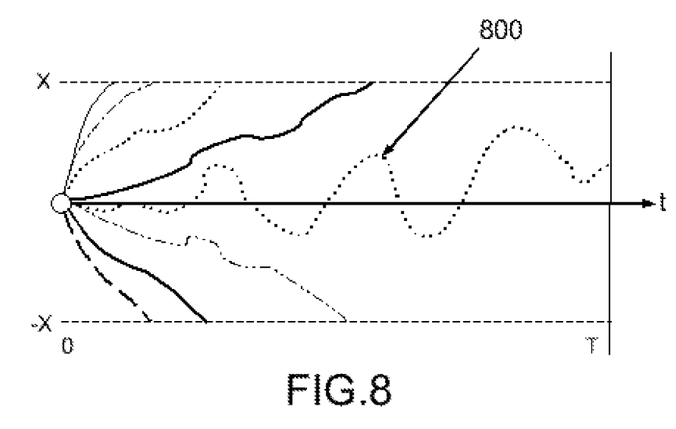
FIG. 8 illustrates the principle of the detection of defective bits in an LPUF.

This principle is illustrated with the aid of FIG. 8, one of the curves 800 corresponds to the least reliable bit, the other curves corresponding to more reliable bits of the signature. As explained previously, once the measurement has been terminated, the unreliable bit may be corrected if the parity is not complied with.

The characteristics of the LPUFs may be used in order to implement a method making it possible to test and/or to select integrated circuits having a negligible probability of generating an erroneous signature. Thus this method makes it possible to increase the reliability of use of the LPUFs since it makes it possible notably to discard the unreliable circuits and also to rank them by reliability level, a circuit having a given reliability level possibly being used for a given family of applications. This method may for example be applied at the end of the process for fabricating the circuits, so as to retain only the most reliable circuits.

Advantageously, this possibility of selecting the circuits makes it possible to dispense with the implementation of an error-correcting code.

The objective of the method is notably to discard the circuits having a probability of generating an erroneous signature greater than a given probability value.

An exemplary implementation of the method is given in the subsequent description. In this example, a circuit comprising an LPUF is considered. The LPUF comprises N=2 chains of lags, each signature bit being deduced from the measurement of frequency difference $\delta_j$ such as defined previously.

By considering a population of circuits that have been fabricated identically, the variable $\delta_j$ follows a Gaussian distribution with zero mean and variance $\sigma^2$, that is to say:

$$\delta_j \in N(0, \sigma^2) \quad (6)$$

N(a,b) representing a Gaussian law with mean a and variance b.

At the level of a circuit, each measurement of $\delta_j$ is sensitive to the environment. A measured value of $\delta_j$ corresponding to the j-th bit of the signature of the circuit is denoted $\hat{\delta}_j$ follows a Gaussian distribution centered at $\delta_j$ and of variance $s^2$ corresponding to the measurement noise, that is to say:

$$\hat{\delta}_j \in N(\delta_j, s^2) \quad (7)$$

The value of $\delta_j$ must be as far as possible from 0 so as to obtain a reliable value of the measurement $\hat{\delta}_j$. The probability of error in bit j, denoted $P_{e,j}$, corresponds, for example, to the probability that the sign of the measured value $\hat{\delta}_j$ is different from the sign of the expected value $\delta_j$. This probability can be expressed using the following expression:

$$P_{e,j} = \frac{1}{2}\left(1 - \text{erf}\left(\frac{\delta_j}{s\sqrt{2}}\right)\right) \quad (8)$$

in which the function erf( ) is the Gauss error function.

Figure 7:
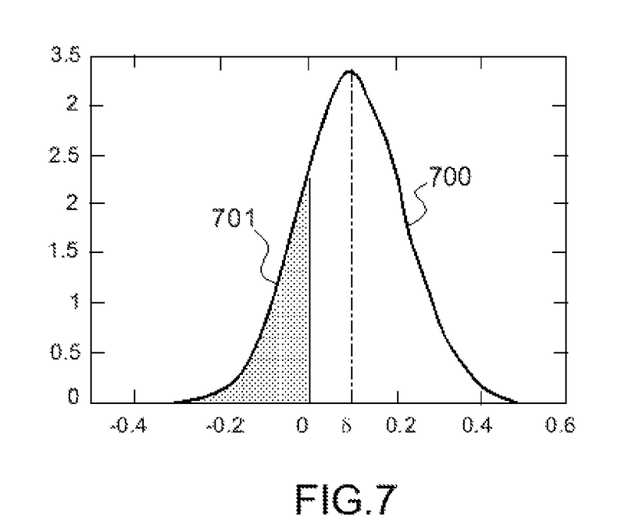
FIG. 7 gives an exemplary error function making it possible to estimate the reliability of the LPUF.

A graphical example representing this error is given in FIG. 7. $P_{e,j}$ corresponds to an area 701 corresponding to the integration between $-\infty$ and 0 of the probability density of $\hat{\delta}_j$, 700.

This probability of error $P_{e,j}$ is significant if $\delta_j$ is close to 0. It may be reduced in practice by performing a number T of trials during which the results of measurements are accumulated. Thus T measurements $\hat{\delta}_j$ are carried out. $P_{e,j}$ can be expressed using the following expression:

$$P_{e,j} = \frac{1}{2}\left(1 - \text{erf}\left(\frac{\sqrt{T} \times \delta_j}{s\sqrt{2}}\right)\right) \quad (9)$$

Thus, if $\delta_j$ is low and greater than a threshold value Th, a significant number T of trials must be applied if the desired error probability is low. By fixing a threshold of Th, it is thus possible to eliminate circuits having values of $\delta_j$ of less than Th, while having a certain probability of error and while complying with the number of trials to be carried out. Th may advantageously be chosen while taking account of unfavorable conditions in terms of temperature and supply voltage of the circuit.

If a circuit is considered having a number M of delay elements each associated with a signature bit, it suffices that there be at least one bit j such that $\delta_j <$Th in order for the circuit to be rejected. The probability that a tested circuit is rejected in this example can therefore be predicted using the following expression:

$$P_{rej} = 1 - [1 - P(|\delta_i| < Th)]^M \quad (10)$$

in which expression:

$$P(|\delta_i| < Th) = \text{erf}\left(\frac{Th}{\sqrt{2} \times \sigma}\right). \quad (11)$$

The example hereinabove corresponds to N=2 and control words having only a single bit j at the value 1. The error probability decreases if N>2 or if the control words contain several nonzero bits with a certain Hamming distance HD between them, as expressed by equation (12).

A signature bit is thus correlated with HD delay elements serving to generate the difference between two frequency measurements. It is equivalent to considering that the measurement consists of the sum of HD values of $\delta_j$. It follows therefrom that:

$$P(|\delta_i| < Th) = \text{erf}\left(\frac{Th}{\sqrt{2.HD} \times \sigma}\right) \quad (12)$$

Increasing the Hamming distance HD between the control words used makes it possible consequently to decrease the probability of rejecting the circuits $P_{rej}$. The number B of signature bits may then be far greater than M. The rejection rate in this case is identical to the expression, but replacing M by the effective number of bits B of the signature:

$$P_{rej} = 1 - \left[1 - \text{erf}\left(\frac{Th}{\sigma \times \sqrt{2 \times HD}}\right)\right]^B \quad (13)$$

The method according to the invention performs a series of measurements of possibly as many as T trials, and then to accumulate the results $\hat{\delta}_j$ of said measurements for each bit. The values obtained by virtue of these trials are compared with one or more predefined threshold values. The result of this comparison makes it possible to decide whether that bit of the signature for which the trials have been carried out corresponds to a 0, to a 1 or to an indeterminate value when the threshold is not attained, in which case the bit is considered to be indeterminate or unreliable. An indeterminate value is a value which does not make it possible to decide whether the bit is at '0' or at '1'. This technique makes it possible to enhance the reliability of the measurement results used for generating the bits of the signature and consequently to reduce the probability that a bit of this signature is generated with an error.

Advantageously, the measurement time may be optimized if the control module for the LPUF stops the computation for a given signature bit when a certain threshold value is attained.

For N=2, the measurements correspond, for example, to the differences $\delta_i$ such as previously defined. Thus, two threshold values may be chosen and compared with the results of the aggregated measurements for each bit of the signature, these two thresholds corresponding for example to the values:

Th×T, for which a 1 is chosen if an aggregated measurement is greater than this value;

−Th×T, for which a 0 is chosen if an aggregated measurement is less than this value.

When the accumulation of the measurement results corresponding to a given bit of the signature of the circuit attains one of these threshold values, the measurements are stopped, and a decision is taken as regards the value of the bit.

The principle of successive measurements and of comparison with a threshold may be applied within the framework of the method of testing circuits, but also by the circuits themselves, as explained previously.

For a circuit considered to be reliable subsequent to the application of the test method according to the invention, there will systematically be convergence. The most reliable bits will converge rapidly and the least reliable ones will require more measurement trials.

When the test method is applied to circuits comprising an LPUF comprising a parity bit associated with the signature, the rejection rate may be significantly reduced. Indeed, the test scheme will not reject the circuits having an unreliable signature bit, that is to say for which $\delta_j$<Th.

Figure 9:
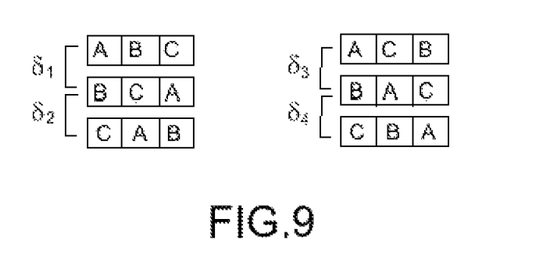
FIG. 9 gives an example of combinations of control words and of comparison of the frequency measurements associated with them and making it possible to reduce the rate of rejection of a circuit comprising an LPUF.

FIG. 9 gives an example of combinations of control word and of comparison of the frequency measurements associated therewith making it possible to reduce the rate of rejection of a circuit comprising an LPUF. When N>2, it is possible to use a measurement which is independent of temperature by using ratios between differences of frequencies rather than differences between measurements. The bits of the signature of the circuit are then deduced from the value of these ratios. FIG. 9 shows the 6 possible combinations of three control words (A,B,C) for N=3.

In this case, the signature bits are deduced from a metric $\Delta_{i,j}$ corresponding, for example, to:

$$\Delta_{i,j} = \frac{\delta_i}{\delta_j} \quad (14)$$

In this equation, the values $\delta_i$ and $\delta_j$ correspond to the differences of the measured frequencies, a difference being measured between two distinct combinations of control words.

The control module for the LPUF then determines the metric $\Delta_{i,j}$ and deduces therefrom a bit of the signature of the circuit. The example of FIG. 9 gives an example in which the first bit $b_0$ of the signature is set to 1 if $\Delta_{1,2}$>0, and equals 0 otherwise. In the same manner, the second bit $b_1$ of the signature is set to 1 if $\Delta_{3,4}$>0, and equals 0 otherwise.

Figure 10:
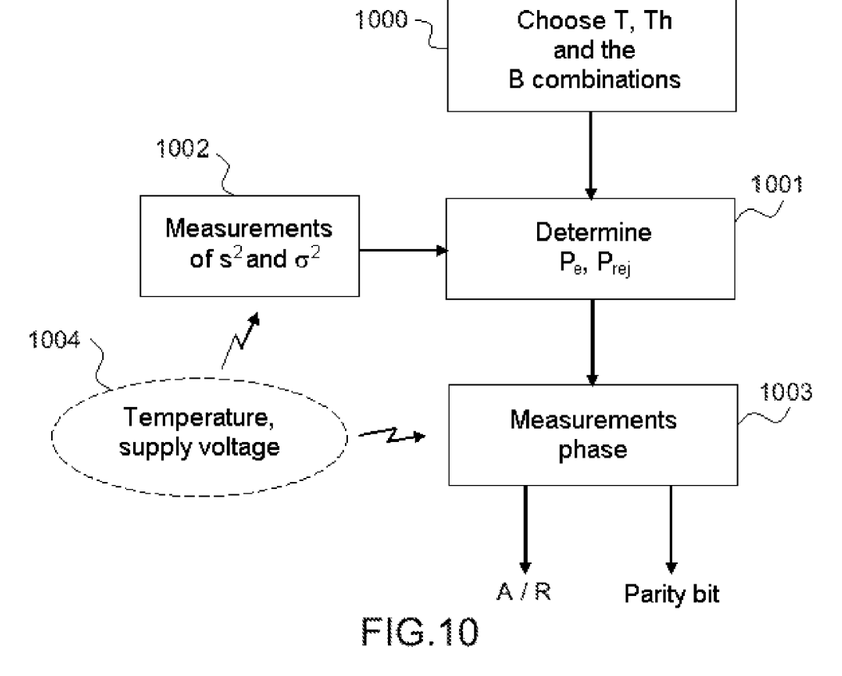
FIG. 10 gives an example of the method of testing circuits according to the invention.

FIG. 10 gives an example of the method of testing circuits according to the invention.

The objective of a first step of the method 1000 is to select the configuration parameters for the test. Thus, the values of the previously defined parameters T and Th may be selected, said values having an influence on the probability of selecting or of rejecting a circuit as well as on the duration of the test. This configuration step also makes it possible to select B combinations of control words so as to guarantee a Hamming distance HD between two combinations of this set of B combinations.

The objective of a second step 1001 of the method is the determination of the probability of error per bit as well as the probability of rejecting the tested circuits. These two probabilities are determined using, for example, expressions (9) and (13) while taking into account on the one hand the parameters T and Th such as chosen during the configuration step, and on the other hand the measured values 1002 of the variance of the measurement noise $s^2$ and of the variance of the measurements $\sigma^2$ that is due to the processing dispersion. The measurement of these variances may be performed by any measurement means known to the person skilled in the art.

The determination of these probabilities makes it possible advantageously to adapt the value of the configuration parameters as a function of the user's needs.

The objective of a third step 1003, termed the measurement phase, is to determine whether the tested circuit is considered reliable. If this is not the case, said circuit is rejected. This measurement phase is applied to all the circuits that the user has decided to test. Accordingly, the control module for the LPUF contained in the circuit to be tested is configured in such a way as to apply the B combinations of control words, selected during the first step, so as to allow the measurements of the frequency differences $\delta_j$. Several measurement trials are performed for each bit of the signature so as to be accumulated and compared with one or more threshold values such as described previously.

If the LPUF has no parity bit at its disposal, the circuit is rejected if at least a bit is not considered reliable.

In the case where the LPUF has a parity bit at its disposal, a tested circuit for which a single bit of the signature is not considered reliable will not be rejected, and a value of the parity bit will be computed on the signature thus generated. This bit will subsequently allow said circuit to detect an error in an unreliable bit and to correct it.

It should be noted that in order to optimize the reliability of this test scheme, the measurements of the variances $s^2$ and $\sigma^2$, and also the measurement phase may advantageously be conducted under conditions corresponding to the extreme operating conditions of the tested circuits. These conditions correspond, for example, to a temperature substantially equal to +70° C. and to a supply voltage substantially lower by 5% with respect to the nominal supply voltage of the tested circuit.

Figure 11:
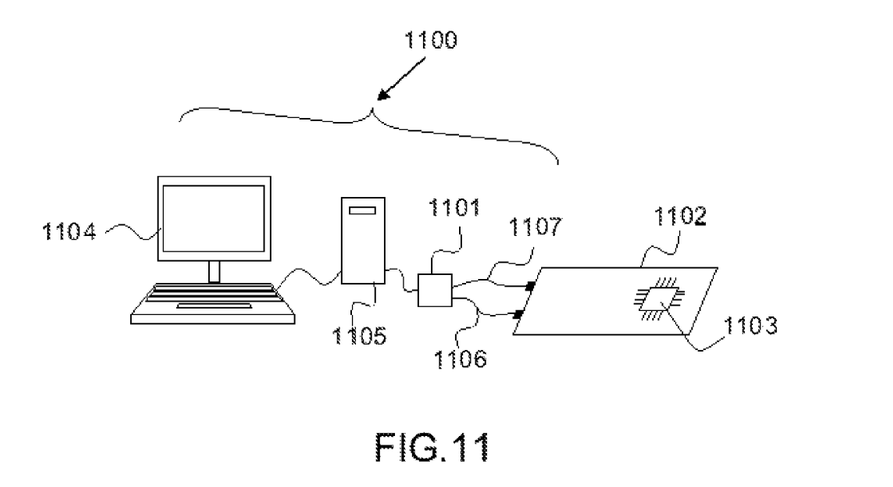
FIG. 11 gives an exemplary test system implementing the method of testing according to the invention.

FIG. 11 gives an exemplary test system implementing the test method according to the invention. The test system 1100 is composed, for example, of a computer 1105 furnished with a user interface 1104. The system also comprises an item of equipment 1101 making it possible to control measurement probes 1106, 1107. These measurement probes are wired up to an electronic card 1102 comprising the electronic circuit to be tested 1103, said circuit comprising an LPUF. The system implements the test method such as described previously. The user interface 1104 makes it possible to configure the test and also to display the results.

The invention claimed is:

1. A silicon integrated circuit including electronic hardware controller configured to implement a physically non-copyable function, the physically non-copyable function being a loop physically unclonable function (LPUF), allowing generation of a signature specific to said silicon integrated circuit, said function, when executed, cause the silicon integrated circuit to:
  implement a ring oscillator having one or more delay elements made of transistors, said delay elements arranged as a loop, said loop being a path traversed by a signal, said loop being formed of N topologically identical chains of lags, N being an integer greater than or equal to two, connected to one another in series and an inversion gate, each chain of lags comprising M number of delay elements connected to one another in series, M being an integer at least equal to 1;
  generate N control words, said control words being used to configure a value of delays introduced by the chains of lags on the signal traversing the chains of lags;
  measure a frequency of the signal at an output of the last chain of lags after updating the N control words; and
  deduce, from the frequency measurements, bits making up the signature specific to the circuit.

2. The circuit as claimed in claim 1, wherein the circuit is an ASIC or an FPGA.

3. The circuit as claimed in claim 1, wherein the signature is used as an encryption key.

4. The circuit as claimed in claim 1, wherein the signature is used for authentication of the circuit.

5. The circuit as claimed in claim 1, wherein:
  the chains of lags are configured to steer the signal traversing them according to at least two distinct paths
  a path introduces a specific delay value, and
  the steering is controlled by at least one bit belonging to a control word.

6. The circuit as claimed in claim 1, wherein challenge words comprised of a concatenation of control words are presented at an input of a control module, said control module generating combinations based on said words to configure the chains of lags.

7. The circuit as claimed in claim 1, wherein the bits of the signature are determined as a function of a ranking of the frequencies measured for various combinations of the control words.

8. The circuit as claimed in claim 1, wherein the bits of the signature are determined as a function of estimated differences between two measured frequency values, wherein a measured frequency value corresponds to a combination of control words.

9. The circuit as claimed in claim 1, wherein the bits of the signature are determined as a function of a ratio between two estimated frequency differences.

10. The circuit as claimed in claim 1, further comprising a random number generator, the random numbers generated being used to select an order in which the frequencies corresponding to combinations of the control words are measured.

11. The circuit as claimed in claim 1, further comprising at least one parity bit, the at least one parity bit being used to correct an incorrectly generated bit of the signature.

12. A method of testing integrated circuits comprising the physically non-copyable function LPUF as claimed in claim 1, wherein a succession of steps is applied to the tested circuits to select circuits configured to generate a signature specific to a circuit with a chosen reliability level, the method comprising:
  selecting parameters T and Th, where T is a number of trials during which a corresponding number of measurements are accumulated and Th is a threshold value for a reliable measurement, for configuring a test and B number of combinations of control words having a Hamming distance at least equal to a predefined value HD, B being a number of bits in the signature, with both B and T being integers each at least equal to 1;
  measuring representative quantities indicative of the signature bits of the circuit, up to said corresponding number of measurements per signature bit, the corresponding number of measurements being accumulated to decide whether a corresponding bit is indeterminate; and
  after comparing with at least one value deduced from a value of the parameter Th, selecting tested circuits as a function of a number of indeterminate bits detected.

13. The method as claimed in claim 12, further comprising a determining a probability that a circuit is not selected, said probability being determined by using the expression:

$$P_{rej} = 1 - \left[1 - \text{erf}\left(\frac{Th}{\sigma \times \sqrt{2 \times HD}}\right)\right]^B$$

in which:
  erf( ) is a Gauss error function, and
  $\sigma$ is a variance of measurements of quantities representative of the signature bits of the circuit.

14. The method as claimed in claim 13, further comprising determining a probability of error per signature bit, said probability being determined by using the expression:

$$P_{e,j} = \frac{1}{2}\left(1 - \text{erf}\left(\frac{\sqrt{T} \times \delta_j}{s\sqrt{2}}\right)\right)$$

in which:
  erf( ) is a Gauss error function;
  $\delta_j$ is a frequency difference measured between two frequencies corresponding to an application of two distinct combinations of control words; and
  s is defined such that $s^2$ is a variance of the measurement noise.

15. The method as claimed in claim 12, wherein a circuit is selected if no bit of the signature is indeterminate.

16. The method as claimed in claim 12, wherein when the LPUF function of a tested circuit is associated with a parity bit whose value is determined on a basis of the signature of said circuit, said circuit is selected if the number of indeterminate bits is less than 2.

17. The method as claimed in claim 14, wherein the values of $s^2$ and of $\sigma^2$ are measured for a temperature equal to +70° C. and a supply voltage for the circuits that is lower by 5% with respect to a nominal supply voltage, the measurements phase being conducted under the same conditions.

18. A test system implementing the method as claimed in claim 13, further comprising a computer with a user interface, with equipment configured to control measurement probes, said probes collecting measurements of representative quantities indicative of the signature bits produced by tested circuits, wherein the computer processes the measurements and displays the measurements on the user interface.

* * * * *